US00RE43354E

(19) United States
(12) Reissued Patent
Bae

(10) Patent Number: US RE43,354 E
(45) Date of Reissued Patent: May 8, 2012

(54) DRIVING CIRCUIT ELECTROLUMINESCENCE CELL

(75) Inventor: Sung Joon Bae, Sungnam-shi (KR)

(73) Assignee: LG Display Co., Ltd., Seoul (KR)

(21) Appl. No.: 10/835,579

(22) Filed: Apr. 30, 2004

Related U.S. Patent Documents

Reissue of:
(64) Patent No.: 6,570,338
Issued: May 27, 2003
Appl. No.: 09/918,827
Filed: Aug. 1, 2001

(51) Int. Cl.
*G09G 3/10* (2006.01)

(52) U.S. Cl. ..... 315/169.3; 315/169.1; 345/76; 345/78

(58) Field of Classification Search ..... 315/169.3, 315/76, 78, 169.1, 169.4; 345/76, 78, 77, 345/80, 82, 92

See application file for complete search history.

(56) References Cited

U.S. PATENT DOCUMENTS

| | | | | |
|---|---|---|---|---|
| 5,235,253 | A * | 8/1993 | Sato | 315/169.3 |
| 5,302,966 | A * | 4/1994 | Stewart | 345/76 |
| 5,386,179 | A * | 1/1995 | Sato | 315/169.3 |
| 5,559,402 | A * | 9/1996 | Corrigan, III | 315/169.3 |
| 5,684,365 | A * | 11/1997 | Tang et al. | 315/169.3 |
| 5,748,026 | A | 5/1998 | Maekawa et al. | |
| 5,786,796 | A * | 7/1998 | Takayama et al. | 345/76 |
| 6,229,506 | B1 | 5/2001 | Dawson et al. | |
| 6,359,605 | B1 * | 3/2002 | Knapp et al. | 345/76 |
| 6,380,688 | B1 * | 4/2002 | Bae et al. | 315/169.3 |
| 2002/0011799 | A1 * | 1/2002 | Kimura | 315/169.3 |

* cited by examiner

*Primary Examiner* — Tho G Phan
(74) *Attorney, Agent, or Firm* — Birch, Stewart, Kolasch & Birch, LLP

(57) ABSTRACT

A driving circuit for an electro-luminescence (EL) cell includes an EL cell, and a supply circuit selectively applying current to the EL cell based on a pixel signal from a data line. A control circuit controls current flow from the supplying circuit to the EL cell such that an amount of current for discriminating between gray scale levels is approximately tens of micro-amps.

38 Claims, 2 Drawing Sheets

DRIVING CIRCUIT ELECTROLUMINESCENCE CELL

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to an electro-luminescence display (ELD), and more particularly to a driving circuit for driving electro-luminescence cells arranged on an electro-luminescence panel in a matrix type.

2. Description of the Related Art

Generally, an electro-luminescence (EL) panel converts an electrical signal into light energy to thereby display a picture corresponding to video signals (or image signals). Such an EL panel includes EL cells arranged at intersections between gate lines and data lines. Each of the EL cells responds to a pixel signal from the data line to generate a light corresponding to a magnitude of the pixel signal.

In order to stably apply a pixel signal to each EL cell, the EL panel has cell-driving circuits scanned sequentially line-by-line. Each of the EL cell-driving circuits responds to a control signal at the gate line to sample a pixel signal at the data line and then holds the sampled pixel signal during the next frame interval, to thereby stably apply the pixel signal to the EL cell.

As shown in FIG. 1, a conventional EL cell-driving circuit for carrying out such sampling and holding operations of a pixel signal includes a first PMOS thin film transistor (TET) MP1 connected between an EL cell ELC and a first node Ni. A gate of the first PMOS TFT MP1 is connected to a second node N2, and the EL cell ELC is also connected to ground. A second PMOS TFT MP2 is connected between the second node N2 and the EL cell ELC, and is connected at its gate to a gate line GL. A capacitor C1 is connected between the first and second nodes N1 and N2.

The capacitor C1 charges a voltage of a pixel signal when the pixel signal is applied from a data line DL and applies the charged pixel voltage to gate electrodes of the first PMOS TFT MP1. The first PMOS TET MP1 is turned on by the pixel voltage charged in the capacitor C1, thereby allowing a supply voltage VDD applied, via the first node Ni, from a voltage supply line VDDL to be supplied to the EL cell ELC.

At this time, the first PMOS TFT MP1 varies its channel width depending on a voltage level of the pixel signal to control a current amount applied to the EL cell ELC. Then, the EL cell ELC generates a light corresponding to the current amount applied from the first PMOS TFT MP1. The second PMOS TET MP2 responds to a gate signal GLS, as shown in FIG. 2, applied from the gate line GL to selectively connect the second node N2 to the EL cell ELC.

More specifically, the second PMOS TFT MP2 connects the second node N2 to the EL cell ELC at a time interval when the gate signal GLS is enabled at a low logic, thereby allowing the pixel signal to be charged in the capacitor C1. In other words, the second PMOS TFT MP2 forms a current path of the capacitor C1 at a time interval when the gate signal GLS at the gate line GL is enabled. The capacitor C1 charges the pixel signal in the enabling interval of the gate signal GLS, thereby allowing the gate electrode of the first PMOS TFT MP1 to have a lower voltage than the drain electrode by a voltage level of the charged pixel signal. Accordingly, a channel width of the first PMOS TFT MP1 is controlled in accordance with a voltage level of the pixel signal to determine a current amount flowing from the first node N1 into the EL cell ELC.

The conventional EL cell driving circuit further includes a third PMOS TFT MP3, connected between the data line DL and the first node N1, responding to a gate signal at the gate line GL, and a fourth PMOS TFT MP4, connected between the voltage supply line VDDL and the first node N1, responding to an inverted gate signal /GLS from a gate bar line /GL.

The third PMOS TFT MP3 is turned on at a time interval when a low logic of gate signal is applied from the gate line GL, thereby connecting the capacitor C1, coupled to the first node N1 and the source electrode of the first PMOS TFT MP1, to the data line DL. In other words, the third PMOS TFT MP3 responds to a low logic of gate signal GLS to send a pixel signal at the data line DL to the first node N1. to the data line DL. In other words, the third PMOS TFT M3 responds to a low logic of gate signal GLS to send a pixel signal at the data line DL to the first node N1.

As a result, the third PMOS TFT MP3 is turned on during a time interval when a gate signal at the gate line GL remains at a low logic, thereby charging a pixel signal into the capacitor C1 connected between the first and second nodes N1 and N2. The fourth PMOS TET MP4 is turned on in a time interval when a low logic of inverted gate signal /GLS from the gate bar line /GL is applied to the gate electrode thereof, thereby connecting the first node N1, to which the capacitor C1 and the source electrode of the first PMOS TFT MP1 are connected, to the voltage supply line VDDL.

At a time interval when the fourth PMOS TET MP4 has been turned on, a supply voltage VDD at the voltage supply line VDDL is applied, via the first node N1 and the first PMOS TFT MP1, to the EL cell ELC. Thus, the EL cell ELC generates a light of a quantity according to a voltage level of the pixel signal.

In the conventional EL cell driving circuit, a maximum current amount (i.e., a current margin of a pixel signal) required for obtaining a maximum brightness is small. For this reason, a current difference between gray scale levels of a video signal is approximately several μA. if a current difference between gray scale levels is set to several μA, a data driver integrated circuit (IC) chip must have the ability to control current at a range of several μA accurately. However, it is very difficult to manufacture a data driver IC chip capable of controlling a current at a range of several μA accurately. As a result, the conventional EL cell driving circuit has problems with driving the conventional EL panel to accurately display a gray scale of a picture.

SUMMARY OF THE INVENTION

The present invention provides a driving circuit for an electro-luminescence cell that increases a current difference of a pixel signal for identifying gray scale levels.

The present invention also provides an electro-luminescence panel that more accurately displays a gray scale of a picture.

In the electro-luminescence (EL) panel according to the present invention, the driving circuit for an electro-luminescence (EL) cell includes an EL cell; a supply is circuit selectively applying current to the EL cell based on a pixel signal from a data line; and a control circuit controlling current flow from the supplying circuit to the EL cell such that an amount of current for discriminating between gray scale levels is approximately tens of micro-amps.

According to an embodiment of the present invention, the supplying circuit includes a first transistor connected between the EL cell and a voltage supply line, and the control circuit includes a second transistor connected between the data line and the voltage supply line such that the first and second transistors form a current mirror. In a preferred embodiment, the second transistor has a channel width of 3 to 20 times greater than a channel width of the first transistor.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENT

Figure 3:
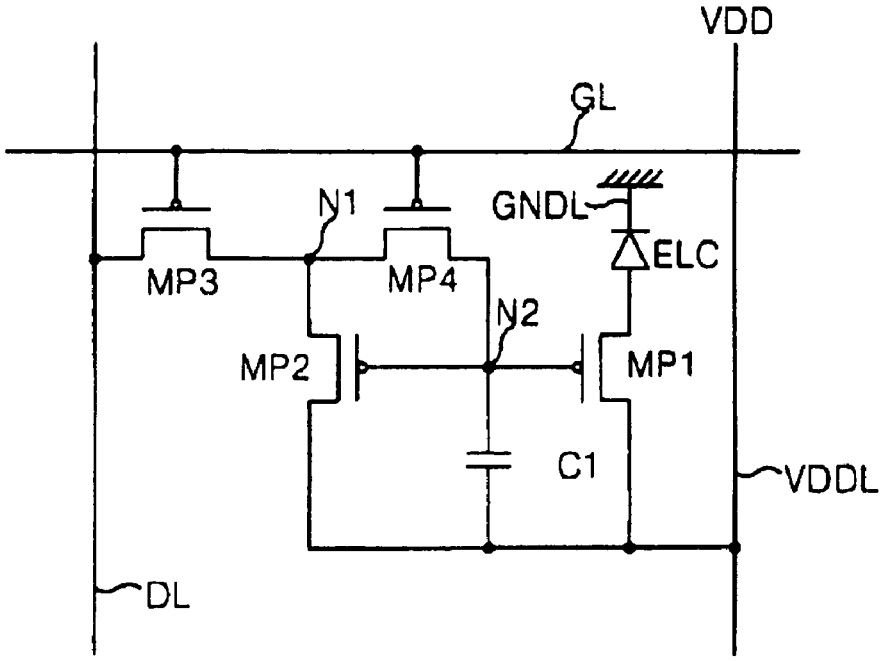
FIG. 3 is a circuit diagram showing a configuration of a driving circuit for an electro-luminescence cell according to an embodiment of the present invention.

Referring to FIG. 3, there is shown a driving circuit for an electro-luminescence (EL) cell according to an embodiment of the present invention.

The EL cell driving circuit includes an EL cell ELC connected to ground, and a first PMOS TFT MP1 connected between the EL cell ELC and a voltage supply line VDDL. A second PMOS TFT MP2 is connected between a first node and the voltage supply line VDDL, and both of the gates of the first and second PMOS TFTs MP1 and MP2 are connected to a second node N2. The first and second PMOS TFTs MP1 and MP2 form a current mirror between the first node N1 and the voltage supply line VDDL. A capacitor C is connected between the second node N2 and the voltage supply line VDDL. Third and fourth PMOS TFTs MP3 and MP4 are connected in series between a data line DL and the second node N2. The gates of the third and fourth PMOS TFTs MP3 and MP4 are connected to a gate line GL.

The operation of the driving circuit in FIG. 3 will be described assuming the third and fourth PMOS TFTs MP3 and MP4 are on. Then, the operation of the third and fourth PMOS TFTs MP3 and MP4 will be described.

The capacitor C charges to a difference voltage corresponding to a difference between a voltage of a pixel signal and a supply voltage VDD at the voltage supply line VDDL when the pixel signal is applied from a data line DL, and commonly applies the difference voltage to the gate electrodes of the first and second PMOS TFTs MP1 and MP2. The first PMOS TFT MP1 is turned on by the difference voltage charged in the capacitor C and applies the supply voltage VDD at the voltage supply line VDDL to the EL cell ELC. At this time, a channel width of the first PMOS TFT MP1 is varied depending on a voltage level of the pixel signal to control an amount of current applied from the voltage supply line VDDL to the EL cell ELC. Then, the EL cell ELC generates light corresponding to the amount of current applied, via the first PMOS TFT MP1, from the voltage supply line VDDL. Meanwhile, the second PMOS TFT MP2 controls a current amount flowing from the voltage supply line VDDL into the data line DL when a pixel signal is applied from the data line DL, thereby determining an amount of current applied to the EL cell ELC via the first PMOS TFT MP1.

A channel width of the second PMOS TFT MP2, which determines a current amount flowing via the first PMOS TFT MP1 as mentioned above, is formed to be equal to several to tens of times the channel width of the first PMOS TFT MP1. For instance, a channel width ratio of the first PMOS TFT MP1 to the second PMOS TFT MP2 may be in a range of 1:3 through 1:20. To the contrary, if the channel width ratio is in a range of 3:1 through 10:1, then it has an advantage in power consumption. Making the channel widths of the first and second PMOS TFTs MP1 and MP2 different from each other as described above, increases an amount of the current difference in the pixel signal for discriminating gray scale levels to approximately tens of μA. Even though a current amount flowing via the second PMOS TFT MP2 is varied at a difference of tens of μA by such a pixel signal, a current amount applied, via the first PMOS TFT MP1 having a channel width as small as several to tens of times the channel width of the second PMOS TFT MP2, to the EL cell ELC is varied at a difference of several μA. Accordingly, an EL panel driving IC chip driving the data line DL can be made such that it generates a pixel signal corresponding to a gray scale of video signal or image signal. Furthermore, the EL panel can display a gray scale of a picture with the aid of such a data line driving IC chip.

The third PMOS TFT MP3 is turned on at a time interval when a low logic of gate signal is applied from the gate line GL, thereby connecting the drain electrode of the third PMOS TFT MP3 connected to the first node N1 to the data line DL. In other words, the third PMOS TFT MP3 plays a role to send a pixel signal at the data line DL in response to a tow logic of the gate signal. The fourth PMOS TFT MP4 also is turned on at a time interval when a low logic gate signal is applied from the gate line GL to the gate electrode thereof, thereby connecting the second node N2 via the first node N1 to the data line DL. In other words, the third and fourth PMOS TFTs MP3 and MP4 are turned on at a time interval when a gate signal at the gate line GL remains at a low logic, thereby charging the pixel signal into the capacitor C connected between the second node N2 and the voltage supply line VDDL.

As described above, according to the present invention, a channel width of a PMOS TFT, forming part of a current mirror and responding to a pixel signal, is enlarged by several to tens of times the channel width of the other PMOS TFT in the current mirror that supplies current to the EL cell, thereby increasing an amount of the current difference in the pixel signal for discriminating gray scale levels. Accordingly, the present EL cell driving circuit permits manufacturing a data line driving IC chip suitable for realizing a gray scale of a picture. Also, it permits an EL panel to accurately display a gray scale of a picture.

Figure 1:
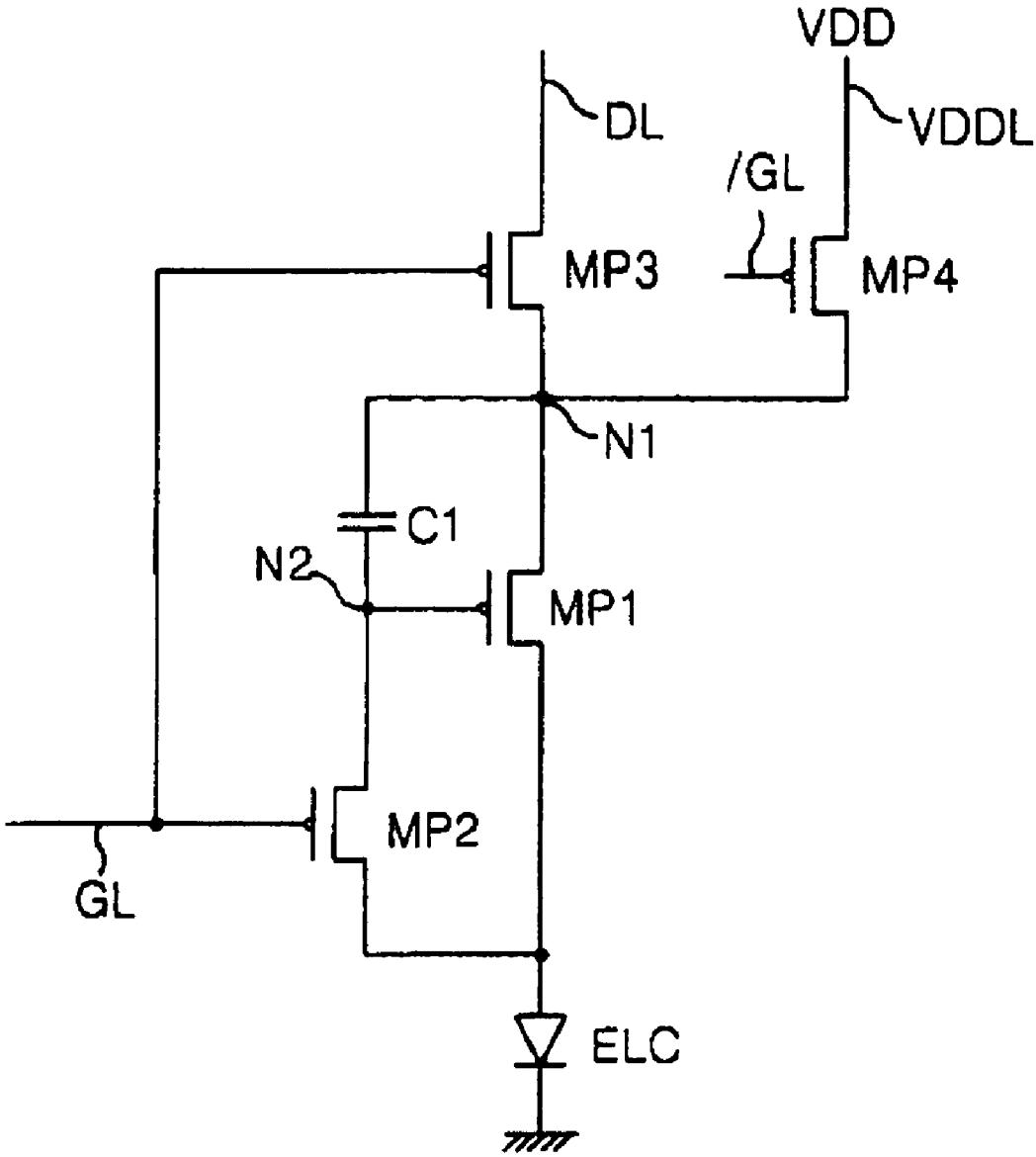
FIG. 1 CONVENTIONAL ART
FIG. 1 is a circuit diagram showing a configuration of a driving circuit for a conventional electro-luminescence cell.
Figure 2:
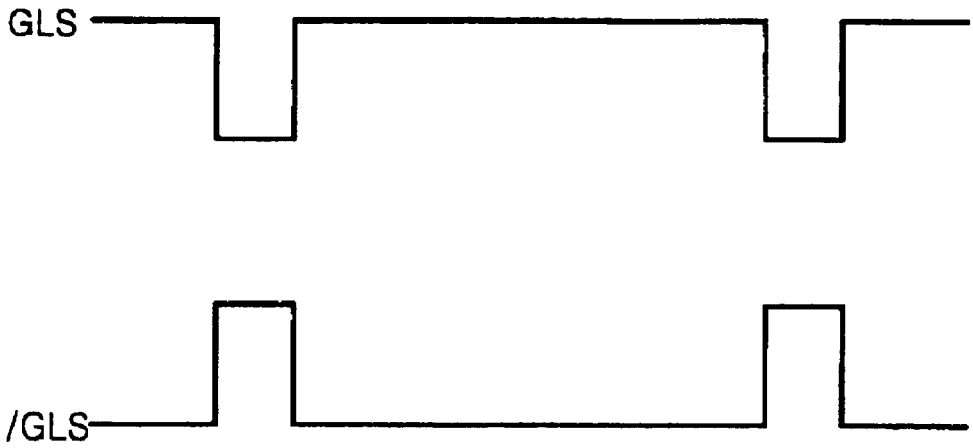
FIG. 2 CONVENTIONAL ART
FIG. 2 is a waveform diagram of driving signals applied to the gate line and the gate bar line shown in FIG. 1.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. For example, the PMOS transistors MP1 through MP4 included in the embodiment of the present invention shown in FIG. 3 can be replaced with NMOS transistors, In this case, the gate signal to be applied to the gate line GL has a waveform the same as /GLS of FIG. 2. Accordingly, the scope of the invention shall be determined only by the appended claims and their equivalents.

What is claimed is:

1. A driving circuit for an electro-luminescence (EL) cell, comprising:

an EL cell;

a supply circuit selectively applying current to the EL cell based on a pixel signal from a data line, the supply circuit including a first transistor connected between the EL cell and a voltage supply line and a charge storage device storing a charge based on the pixel signal; [and]

a control circuit controlling current flow from the supply circuit to the EL cell, the control circuit including a second transistor connected between the data line and the voltage supply line such that the first and second transistors form a current mirror, the first and second transistors having gates connected to the charge storage [device.]*device;*

*a third transistor connected between a data supply line and the second transistor, and a gate of the third transistor connected to a gate signal supply line;*

*a first node connected between the third transistor and the second transistor; and*

*a fourth transistor connected between the first node and the gate of the first transistor and between the first node and the gate of the second transistor, and a gate of the fourth transistor connected to the gate signal supply line.*

2. The driving circuit of claim 1, wherein the second transistor has a channel width[of]*-to-length ratio that is* 3 to 20 times greater than a channel width-*to-length ratio* of the first transistor.

3. The driving circuit of claim [2] *1*, wherein the first transistor has a channel width[of]*-to-length ratio that is* 3 to 10 times greater than a channel width-*to-length ratio* of the second transistor.

[4. The driving circuit of claim 1, further comprising:

a third transistor connected between a data supply line and the second transistor, and a gate of the third transistor connected to a gate signal supply line; and a fourth transistor connected between the third transistor and the gates of the first and second transistors, and a gate of the fourth transistor connected to the gate signal supply line.]

5. The driving circuit of claim 1, further comprising:

an enable circuit selectively connecting the supply and control circuits to the data line based on a gate signal.

6. An electrode luminescence panel comprising the driving circuit for the electro-luminescence cell as described in claim 1.

7. The driving circuit of claim 1, wherein an amount of current for discriminating between gray scale levels is approximately tens of micro-amps.

8. A driving circuit for an electro-luminescence (EL) cell, comprising:

an EL cell;

a supply circuit selectively applying current to the EL cell based on a pixel signal from a data line, the supply circuit including a first transistor connected between the EL cell and a voltage supply line and receiving a voltage dependent on the pixel signal at a gate thereof;

a control circuit controlling current flow from the supplying circuit to the EL cell, the control circuit including a second transistor connected between the data line and the voltage supply line and a gate of the second transistor being connected to the gate of the first transistor; [and]

*a third transistor connected between a data supply line and the second transistor, and a gate of the third transistor connected to a gate signal supply line;*

*a first node connected between the third transistor and the second transistor;*

*a fourth transistor connected between the first node and the gate of the first transistor and between the first node and the gate of the second transistor, and a gate of the fourth transistor connected to the gate signal supply line; and* a charge storage device connected between the gates of the first and second transistors and the voltage supply line.

9. The driving circuit of claim 8, wherein the second transistor has a channel width[of]*-to-length ratio that is* 3 to 20 times greater than a channel width-*to-length ratio* of the first transistor.

10. The driving circuit of claim [9] *8*, wherein the first transistor has a channel width[of]*-to-length ratio that is* 3 to 10 times greater than a channel width-*to-length ratio* of the second transistor.

[11. The driving circuit of claim 8, further comprising:

a third transistor connected between a data supply line and the second transistor, a gate of the third transistor connected to a gate signal supply line; and a fourth transistor connected between the third transistor and the gates of the first and second transistors, a gate of the fourth transistor connected to a gate signal supply line.]

12. A driving circuit for an electro-luminescence (EL) cell, comprising:

an EL cell;

a current mirror including a first and *a* second transistor, the first transistor supplying current to the EL cell based on a pixel signal, and the second transistor controlling the supply of current through the first transistor, the first and second transistors having gates connected to a charge storage [device.]*device;*

*a third transistor connected between a data supply line and the second transistor, and a gate of the third transistor connected to a gate signal supply line;*

*a first node connected between the third transistor and the second transistor; and*

*a fourth transistor connected between the first node and the gate of the first transistor and between the first node and the gate of the second transistor, and a gate of the fourth transistor connected to the gate signal supply line.*

13. The driving circuit of claim 12, wherein [the] *a* channel width-*to-length ratio* of the first transistor is 3 to 10 times greater than [the] *a* channel width-*to-length ratio* of the second transistor.

14. The driving circuit of claim 12, further comprising:

an enabling circuit selectively enabling operation of the current mirror based on a gate signal.

15. [A] *The* driving circuit of claim 12, wherein the second transistor has a channel width-*to-length ratio* that is 2 to 20 times greater than a channel width-*to-length ratio* of the first transistor.

16. A driving circuit for an electro-luminescence (EL) cell, comprising:

an EL cell; [and]

a current mirror including a first transistor and *a* second transistor, the first transistor supplying current to the EL cell based on a pixel signal, and the second transistor controlling the supply of current through the first transistor, a channel width-to-length ratio of the second transistor formed to be a ratio of a channel width-to-length ratio of the first [transistor.]*transistor;*

*a third transistor connected between a data supply line and the second transistor, and a gate of the third transistor connected to a gate signal supply line;*

*a first node connected between the third transistor and the second transistor; and*

*a fourth transistor connected between the first node and the gate of the first transistor and between the first node and the gate of the second transistor, and a gate of the fourth transistor connected to the gate signal supply line.*

*17. The driving circuit of claim 1, wherein the second transistor has a current capacity greater than a current capacity of the first transistor.*

*18. The driving circuit of claim 1, wherein the first transistor has a current capacity greater than a current capacity of the second transistor.*

*19. The driving circuit of claim 1, wherein the second transistor has a channel dimension greater than a channel dimension of the first transistor.*

*20. The driving circuit of claim 1, wherein the first transistor has a channel dimension greater than a channel dimension of the second transistor.*

*21. The driving circuit of claim 1, wherein the second transistor has a channel width-to-length ratio that is greater than a channel width-to-length ratio of the first transistor.*

*22. The driving circuit of claim 1, wherein the first transistor has a channel width-to-length ratio that is greater than a channel width-to-length ratio of the second transistor.*

*23. The driving circuit of claim 8, wherein the second transistor has a current capacity greater than a current capacity of the first transistor.*

*24. The driving circuit of claim 8, wherein the first transistor has a current capacity greater than a current capacity of the second transistor.*

*25. The driving circuit of claim 8, wherein the second transistor has a channel dimension greater than a channel dimension of the first transistor.*

*26. The driving circuit of claim 8, wherein the first transistor has a channel dimension greater than a channel dimension of the second transistor.*

*27. The driving circuit of claim 8, wherein the second transistor has a channel width-to-length ratio that is greater than a channel width-to-length ratio of the first transistor.*

*28. The driving circuit of claim 8, wherein the first transistor has a channel width-to-length ratio that is greater than a channel width-to-length ratio of the second transistor.*

*29. The driving circuit of claim 12, wherein the second transistor has a current capacity greater than a current capacity of the first transistor.*

*30. The driving circuit of claim 12, wherein the first transistor has a current capacity greater than a current capacity of the second transistor.*

*31. The driving circuit of claim 12, wherein the second transistor has a channel dimension greater than a channel dimension of the first transistor.*

*32. The driving circuit of claim 12, wherein the first transistor has a channel dimension greater than a channel dimension of the second transistor.*

*33. The driving circuit of claim 12, wherein the second transistor has a channel width-to-length ratio that is greater than a channel width-to-length ratio of the first transistor.*

*34. The driving circuit of claim 12, wherein the first transistor has a channel width-to-length ratio that is greater than a channel width-to-length ratio of the second transistor.*

*35. The driving circuit of claim 16, wherein the second transistor has a current capacity greater than a current capacity of the first transistor.*

*36. The driving circuit of claim 16, wherein the first transistor has a current capacity greater than a current capacity of the second transistor.*

*37. The driving circuit of claim 16, wherein the second transistor has a channel dimension greater than a channel dimension of the first transistor.*

*38. The driving circuit of claim 16, wherein the first transistor has a channel dimension greater than a channel dimension of the second transistor.*

*39. The driving circuit of claim 16, wherein the second transistor has a channel width-to-length ratio that is greater than a channel width-to-length ratio of the first transistor.*

*40. The driving circuit of claim 16, wherein the first transistor has a channel width-to-length ratio that is greater than a channel width-to-length ratio of the second transistor.*

* * * * *